Nov. 18, 1958     P. J. McKEOWN     2,861,233
SERVOMECHANISM HAVING UNLIMITED SERVOING RANGE
Filed Jan. 24, 1957
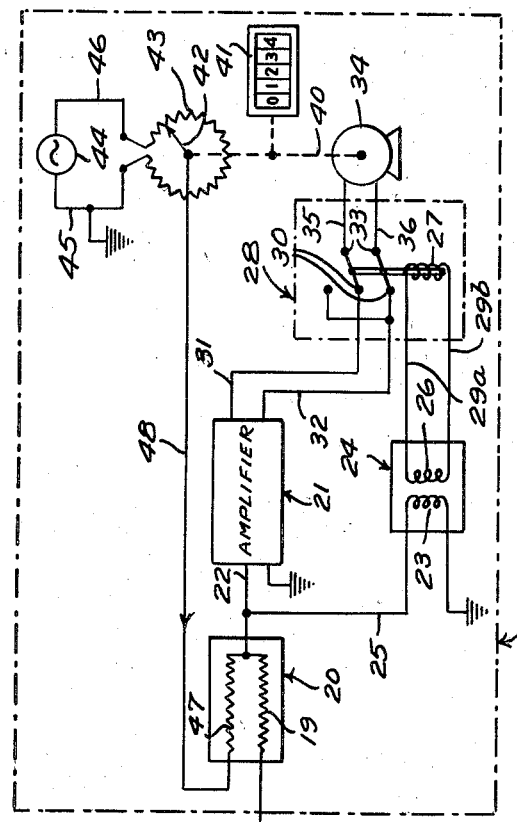
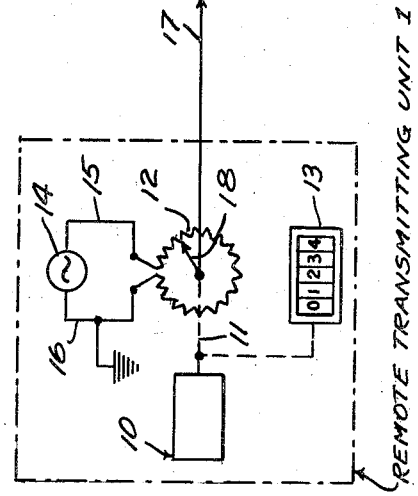
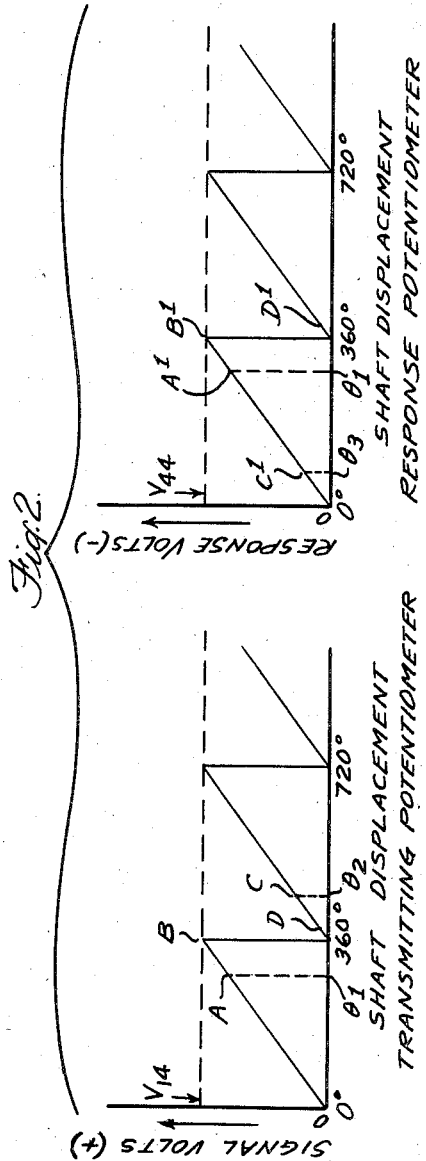
INVENTOR
PATRICK J. McKEOWN
BY
ATTORNEY

United States Patent Office

2,861,233
Patented Nov. 18, 1958

2,861,233

SERVOMECHANISM HAVING UNLIMITED SERVOING RANGE

Patrick J. McKeown, Syosset, N. Y., assignor to Sperry Rand Corporation, Ford Instrument Company Division, Long Island City, N. Y., a corporation of Delaware Application January 24, 1957, Serial No. 636,060

5 Claims. (Cl. 318—29)

This invention relates to servomechanism systems transmitting position information in accordance with electrical input signals and in particular to an improved means for compounding the normal range of potentiometers employed in such systems so as to extend the limits of the transmission beyond the normal capabilities of the device.

A conventional position servomechanism system is characterized by a transmitting potentiometer operatively driven by an input shaft which controls a remote servoamplifier and motor, the latter driving a response potentiometer and an output counter. The partial control by the transmitting potentiometer is opposed by the response potentiometer in a differential network disposed at the input side of the servoamplifier so that the displacement of the motor shaft follows and is directly proportional to the displacement of the transmitting potentiometer shaft. The limit of the input information is reached when the maximum voltage output of the potentiometers is reached. Any further angular displacement of the transmitting potentiometer shaft will cause its electrical output to fall to zero before it linearly starts up again in accordance with the input shaft position. As the transmitting potentiometer passes the cross-over point, the motor shaft, output counter, and response potentiometer will rotate backwards to seek an equilibrium position of zero phase displacement between the shafts of the two potentiometers.

Known expedients to prevent the reversal of the motor for extending the range of transmission include multiple channel transmission systems and wide range potentiometer components. Such solutions are either expensive and complex or poor in the aspect of resolution.

As presently contemplated, the normal range of the telemetering system is extended by providing a sensor device which will reverse the connection to the servomotor as the "cross-over point" is traversed by the transmitting potentiometer. Since the input to the servoamplifier must respond to the position of the transmitting potentiometer in order to drive the servomotor to a corresponding new shaft position, the neutralizing output of the response potentiometer must lag the input signal to effect the required change in shaft displacements. In general, the contemplated sensor device comprises an impedance matching device and a relay connected to the output of the differential network. The relay circuitry is selected and adjusted to reverse the cable connections to the servomotor when a predetermined upper voltage limit is exceeded by the output of the differential network so that the response potentiometer is driven over the "cross-over point" in step with the transmitting potentiometer. After effecting the "cross-over," the succeeding low voltage output of the differential network will act upon the relay circuitry to return the cable connections to the servomotor in the prior arrangement.

In its embodiments, this invention will permit the compounding of the limits of the potentiometer beyond the "cross-over" in any order of increasing or decreasing direction so as to effect an integration which is limited only by the range of the counter.

The features of the invention will be understood more clearly from the following detailed description taken in conjunction with the following accompanying drawings in which:

Fig. 1 is a schematic diagram of a servomechanism telemetering system having an unlimited range of integration.

Fig. 2 is a diagram illustrating the response of the receiving unit to the control of the transmitting unit.

Referring to the schematic diagram of the telemetering system in Figure 1, a remote transmitting unit 1 comprises a driving device 10 such as a fuel flow meter operatively connected to and driving the shaft 11 of a transmitting potentiometer 12 and a counter 13. The potentiometer 12 is connected across a reference voltage 14 by conductors 15 and 16, the conductor 16 being grounded. A transmission line 17 connected to the slider 18 of the potentiometer 12 inter-connects the remote transmitting unit 1 with a local receiving unit 2, the line 17 being terminated in one input side 19 of a differential network 20 in unit 2. The output side of the differential network 20 is connected to one input terminal of a servoamplifier 21 by a conductor 22 and by conductor 25 to an impedance matching device 24, which may be an amplifier having a high input and low output impedance, comprising a coupling device having an input winding 23. The other input terminals of the amplifier 21 and the input winding 23 being connected to ground. Output winding 26 of the impedance matching device 24 is connected across the solenoid coil 27 of a reversing relay 28 by conductors 29a and 29b. The output of the servoamplifier 21 is connected to a pair of input switch terminals 30 of the reversing relay 28 by conductors 31 and 32 and the output pair of switch terminals 33 of the relay 28 is connected to a servomotor 34 by conductors 35 and 36. Circuit values are selected so that the reversing relay 28 will be energized to reverse the conductors to the servomotor 34 when the output of the differential network exceeds a predetermined voltage level equal to a high percentage, such as 50%, of the reference voltage 14; also to restore the original order of connections when the differential output voltage is below a predetermined voltage level of the reference voltage 14. Shaft 40 of the servomotor 34 drives a counter 41 and the slider 42 of a response potentiometer 43. The response potentiometer 43 is connected across a reference voltage source 44 by conductors 45 and 46, the voltage of sources 44 and 14 being substantially equal and of opposite phase and the conductor 45 being grounded. The slider 42 is connected to the other input side 47 of differential network 20 by a conductor 48.

A displacement of the shaft 11 of the transmitting potentiometer will energize the servomotor 34 to displace the shaft 40 until the voltage output from the response potentiometer exactly nullifies the voltage output from the transmitting potentiometer in the differential network 20, the displacement of the two shafts being equal at the equilibrium position.

As shown in the diagrams in Figure 2, a displacement of $\theta_1$ degrees, which is less than 360°, for the transmitting potentiometer will establish an operating point of A for the transmitting potentiometer and $A^1$ for the response potentiometer, $A^1$ being at $\theta_1$ degrees. When the displacement of the transmitting potentiometer is increased to a value of $\theta_2$ degrees which is greater than 360°, the operating point for the transmitting potentiometer would "cross over" point B to point C, but, if the reversing relay 28 is omitted, as it is in the conventional art, the response servo will not "cross-over" the maximum signal point $B^1$. Instead, the response servo will reverse direction at point $B^1$ and establish a new operating point $C^1$ at $\theta_3$ degrees, where $\theta_3 = \theta_2 - 360°$. With the reversing relay 28 connected in the circuitry as herein disclosed, the voltage applied to the solenoid coil 27 of the reversing relay 28 will be substantially equal to the maximum signal voltage 14 at the instant when the operating point D for the transmitting potentiometer has passed the "cross-over" point B. The instantaneous high order of applied voltage to the relay is a consequence of the inherent instantaneous response lag of the servo system. In combination with selected values of the circuit elements, the ensuing instantaneous reversal of the connecting conductors to the servomotor will cause the response potentiometer to displace in the direction of increasing voltage to carry its operating point over the "cross-over" point $B^1$ to a point $D^1$. For the operating points of D and $D^1$ the output of the differential network 20 is sufficiently low to oblige the reversing relay to restore the original order of connections from the servo-amplifier to the servomotor.

The integration of the transmitted data is limited only by the range of the counter 41 since shafts of the two potentiometers will remain in synchronism to repeatedly compound the range of the potentiometers in any direction of "cross-over." In broader applications, the entire remote transmitting unit 1 can include an analogue-to-digital converter. For such application, the information would be transmitted in a digital form and therefore a digital-to-analogue converter would be necessary in the local receiving unit 2.

It is to be understood that various modifications other than those above described may be effcted by persons skilled in the art without departing from the principle and scope of the invention as defined in the appended claims.

What is claimed is:

1. A closed loop servomechanism comprising a first variable voltage source, a second variable voltage source, means for varying the magnitude of the voltage from said second variable voltage source, a differential network connected at its input side to said first and second variable voltage sources, a servomotor normally connected with a given polarity to the output side of said differential network and in driving connection with said voltage varying means, a polarity reversing relay connected between said differential network and said servomotor, and impedance matching means responsive to the output of said differential network in control of said relay, said impedance matching means being adapted to operate said relay when the output of said network crosses over a predetermined voltage level.

2. A closed loop servomechanism comprising a first variable voltage source, a second variable voltage source, means for varying the magnitude of the voltage of said second variable voltage source, a differential network connected at its input side to said first and second variable voltage sources, a servomotor normally connected with a given polarity to the output side of said differential network and in driving connection with said voltage varying means, a polarity reversing relay connected between said differential network and said servomotor, said relay having a solenoid coil, an impedance matching device connected between said solenoid coil and said differential network, said impedance matching device being adapted to energize said solenoid coil when the output of said network crosses over a predetermined voltage level.

3. A closed loop servomechanism as claimed in claim 2 wherein said second variable voltage source includes a continuously rotating response potentiometer driven by said servomotor, said response potentiometer being connected to one input side of said differential network.

4. A closed loop servomechanism as claimed in claim 3 wherein said first variable voltage source includes a continuously rotating transmitting potentiometer having a shaft adapted to receive angular displacements, said transmitting potentiometer being connected to the other input side of said differential network.

5. A closed loop servomotor as claimed in claim 4 wherein a servoamplifier is connected between said differential network and said reversible connection means.

References Cited in the file of this patent
UNITED STATES PATENTS
2,173,798    Baak _____ Sept. 19, 1939